(12) United States Patent
Tsunematsu

(10) Patent No.: US 8,520,951 B2
(45) Date of Patent: Aug. 27, 2013

(54) IMAGE PROCESSING METHOD, IMAGE PROCESSING APPARATUS, AND COMPUTER READABLE STORAGE MEDIUM

(75) Inventor: Yuuichi Tsunematsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1094 days.

(21) Appl. No.: 12/431,833

(22) Filed: Apr. 29, 2009

(65) Prior Publication Data
US 2009/0274394 A1    Nov. 5, 2009

(30) Foreign Application Priority Data
May 2, 2008    (JP) .................................. 2008-120296

(51) Int. Cl.
*G06K 9/48*    (2006.01)

(52) U.S. Cl.
USPC ........... 382/199; 382/197; 382/253; 382/180; 382/205

(58) Field of Classification Search
USPC .................. 382/165, 173, 176, 199, 242, 274
See application file for complete search history.

(56) References Cited

U.S. PATENT DOCUMENTS

| | | | | |
|---|---|---|---|---|
| 5,119,445 A | * | 6/1992 | Suzuki et al. .................. | 382/205 |
| 5,146,511 A | * | 9/1992 | Shirasaki ....................... | 382/197 |
| 7,126,612 B2 | * | 10/2006 | Sekiguchi et al. ............. | 345/589 |
| 7,173,731 B2 | | 2/2007 | Tanaka | |
| 7,391,917 B2 | * | 6/2008 | Ohta et al. ..................... | 382/253 |
| 7,532,757 B2 | * | 5/2009 | Yoshida et al. ................ | 382/180 |
| 7,593,120 B2 | * | 9/2009 | Kitora et al. .................. | 358/1.13 |
| 2005/0068331 A1 | * | 3/2005 | Sekiguchi et al. ............. | 345/589 |
| 2006/0008113 A1 | * | 1/2006 | Matsukubo et al. ........... | 382/100 |
| 2006/0008114 A1 | * | 1/2006 | Sekiguchi et al. ............. | 382/100 |
| 2006/0045386 A1 | | 3/2006 | Fukuoka et al. ............... | 382/305 |
| 2007/0230809 A1 | | 10/2007 | Ishida ............................ | 382/242 |
| 2012/0038659 A1 | * | 2/2012 | Matsuguma et al. .......... | 345/589 |

FOREIGN PATENT DOCUMENTS

| | | |
|---|---|---|
| EP | 0 482 862 A2 | 4/1992 |
| JP | 5-108823 | 4/1993 |
| JP | 6-20040 | 1/1994 |
| JP | 8-153999 A | 6/1996 |

(Continued)

OTHER PUBLICATIONS

Agui et al., "Fundamentals of C-based Image Processing", First Edition, ISBN 4-7856-3124-4, Shokodo, pp. 53-58 (2000).

(Continued)

*Primary Examiner* — Vu Le
*Assistant Examiner* — Aklilu Woldemariam
(74) *Attorney, Agent, or Firm* — Fitzpatrick, Cella, Harper & Scinto

(57) ABSTRACT

The present invention enables mixture of a core line vectorization process and a outline vectorization process, and comprises: inputting an object image of a vectorization process; extracting a core line of the object image; computing an original line width for every pixel of the core line acquired by the extracting; judging whether every section is indicative of an equal-width line or indicative of a surface figure by using the line width value for every pixel of the core line acquired by the estimating, the every unit delimiting the core line acquired by the extracting between two points of intersections and endpoints; separating a surface figure from the object image on the basis of a judging result of the judging; and approximating functionally the core line judged to be the equal-width line at the judging and a outline of the surface figure separated at the separating, respectively.

13 Claims, 14 Drawing Sheets

(56) References Cited

FOREIGN PATENT DOCUMENTS

| | | |
|---|---|---|
| JP | 3026592 | 1/2000 |
| JP | 2001-357406 A | 12/2001 |
| JP | 2004-265384 | 9/2004 |
| JP | 2006-277150 A | 10/2006 |
| JP | 2008-27132 A | 2/2008 |

OTHER PUBLICATIONS

Toriwaki, "Digital Image Processing for Image Understanding (II)", First Edition, ISBN 4-7856-2004-8, Shokodo, pp. 32-37 (1988).
Office Action which issued on Mar. 9, 2012, in counterpart Japanese application No. 2008-120296.

* cited by examiner

FIG.7

IMAGE PROCESSING METHOD, IMAGE PROCESSING APPARATUS, AND COMPUTER READABLE STORAGE MEDIUM

BACKGROUND OF THE INVENTION

1. Field of the Invention

The present invention relates to a method and an apparatus suitable for processing of a drawing, a line drawing in a document image, or the like, which generate vector information of a figure from a binary format image stored in order of a raster scanning. In particular, the present invention relates to the method and the apparatus processing for adding line width information at the time of reproduction to the binary format image in which an equal-width line portion and a surface portion are mixed after performing a vectorization process on a core line acquired by performing thinning of the equal-width line portion, and on the other hand, performing the vectorization process on a outline of a surface portion.

2. Description of the Related Art

In recent years, a request for paperless issue increases, and digitizing and reusing existing image data has come to be performed frequently. The reuse of the image data such as a drawing and a line drawing in a document image, conventionally, has been performed in a form where binarization processing of the image data is performed and after that, the image data is converted into vector data using a vectorization technology, and this vector data is used with a CAD software, or the like.

Also in a business document, it is desired to digitize and reuse the existing image data. For example, there is such a reuse configuration as performing a variable magnification also on a difference of partial thickness, or an area, or the like, of each portion of an original picture in a form of reflecting a desired variable magnification ratio (that is, a thick portion within the original picture is relatively thick also all over the drawing after varying magnification and a thin potion within the original picture is relatively fine also all over the drawing after varying the magnification.) Such a reuse configuration can be realized by creating the binary format image of the image within an original document, and by the outline vectorization process which performs the vectorization process of the outline.

With respect to the outline vectorization process of the binary format image, the present inventor has already proposed the technology disclosed in Japanese Patent No. 3026592. The processes in this Japanese Patent No. 3026592 comprise a process step determining a connecting direction of points which compose this outline according to the state of the neighborhood pixels, and a process step judging a connection status of the point composing the outline and the other point composing this outline. A position determined in advance is made to be the point which compose the outline based on a state of a noticed pixel and neighborhood pixels thereof, and the position of the noticed pixel is updated on the image data in order of a raster scanning, and the process steps are performed based on the state of the neighborhood pixels for every noticed pixel and the outline points are extracted.

In the above configuration, the state of the noticed pixel in the image data and the neighborhood pixels thereof is held, and this noticed pixel is taken out in order of the raster scanning, and a horizontal and vertical vector between pixels is detected based on the state of the noticed pixel and the neighborhood pixels thereof. The connection status of these vectors between pixels is discriminated, and proposed is a method that operates so that the outline of the image data may be extracted based on the connection status of this discriminated vector between pixels.

The above-mentioned method has an effect which can lessen a capacity of a memory since all the outlines within the original picture can be extracted by one raster scanning, and the memory for storing all the image data is not needed. The method is a outline extraction method which can give a significant width also to the thin line of 1-pixel width by extracting the outline not at the center position of the pixel but at the edge. It has been disclosed that not only the outline of the 4-combination pixel area in which the pixels in the original picture are combined in the four directions is extracted, but also the 8-combination pixel area in which the pixels in the original picture are combined in the eight directions can also be extracted.

The present inventor has disclosed, in Japanese Patent Laid-Open No. H05-108823 (1993), that an efficient outline point extraction is possible by modularizing the vector extraction rule disclosed in Japanese Patent No. 3026592.

In the case of reusing the existing image data in the business document, there also exists considerably the cases that it is preferred to process lines forming a certain figure as mere a line (a straight line, an open curve, a closed curve, or the like), or an assembly of the lines. The typical utilizing method is an editing operation, for example, such as only a part of lines are deleted out of the assembly of the lines, or another line is added, or a partial alteration of curvature, length, thickness, and line types (a continuous line, a broken line, an alternate long and short dash line, or the like) is added to only a part of these lines. As what replies to such a request, there is a core line vectorization process which vectorizes the core line showing features of the original figure.

In the core line vectorization process, an image processing called thinning is utilized well in order to extract the core line. A thinning process is a process which narrows the line width while maintaining the connecting relation of each part on a binary format image so that the line width may become 1 pixel. Then, the binary format image of the acquired core line with the line width of 1 pixel is vectorized for every independent line and closed curve which connects between two points of those endpoints or intersections. The core line vectorization is based on, for example, a method disclosed in U.S. Patent Application Publication No. 2007/230809.

However, since the information with respect to the thickness of each line within the original image (binary format image before thinning) has been lost from the core line acquired by performing this thinning process, the information with respect to the thickness of the original image has not been reflected to the vector data acquired by vectorizing the binary format image of the core line. Accordingly, the thickness of the line is thinly reproduced in the vector data compared with the original image, and a sense of incongruity has been given to the user.

In the original image of the object to be processed, there are many original images in which the equal-width line portion and the surface portion are mixed, and it may be more preferable that as for the equal-width line portion, the core line vectorization process is performed while the core line is extracted, and as for the surface portion, the outline vectorization process of the outline is performed.

An example of the image in which the equal-width line portion and the surface portion are mixed is illustrated in FIG. 2. Figures such as a circle of which the inside are painted, and the line in which the line width changes in the middle of the process cannot be expressed only by the line to which the line width information is given.

In Japanese Patent Laid-Open No. H06-020040 (1994), first, when the facing outline vectors are within a certain width after detecting the outline of the image and forming the outline vector, the core line vector is made to be formed while the center line of the outline vector is made to be the core line. In the patent, described is the image processing apparatus characterized in that separation of the line part and the surface part is performed by creating a virtual vector combining the outlines of the both sides corresponding to the breakpoint in which the core line vector is not formed.

However, in Japanese Patent Laid-Open No. H06-020040 (1994), the condition whether to form the core line vector is made to be whether the facing outlines are within the certain width. Therefore, the line of which the thickness changes gradually also becomes the equal-width line, or in the image including a thick line, an appearance changes greatly between the original image and a vector reproduced image by the failure in the separation of the equal-width line portion and the surface potion.

In Japanese Patent Laid-Open No. 2004-265384, described is an image processing apparatus characterized in that the center line of the two outlines is vectorized so as to have a width in the case of the outline being close to each other in a certain section after extracting the outline vector of the image, and of the distance among the outlines being a fixed length averagely.

However, in the method disclosed in Japanese Patent Laid-Open No. 2004-265384, there is a problem that the crossing part where both equal-width-lines are connected to each other is not included in any equal-width lines and remains as the surface portion, in the intersection where the equal-width lines are connected to each other. In this case, an editing performance is not good and also the amount of the vector data increases.

Like two prior arts mentioned above, there is a problem that the method in which the equal-width line portion and the surface portion are separated from the vector information of the outline will have needed the process which is high in the computing load, such as the process which calculates a pair of outlines, and the process which calculates the distance among outlines.

SUMMARY OF THE INVENTION

On the binary format image in which the equal-width line portion and the surface portion are mixed in the present application, as for the equal-width line portion, the core line vectorization process is performed while the information reflecting the thickness of the line in the original image is added after the core line is extracted by means of thinning, and as for the surface portion, the outline vectorization process is performed. The present invention provides a method, a device, and a program which enable the mixture of the core line vectorization process and the outline vectorization process in this way.

In order to solve the above-mentioned subject, an image processing method of the present invention comprises the steps of: an image inputting step for inputting an object image of a vectorization process; a core line extracting step for extracting a core line of an object image of the vectorization process; a line width estimating step for computing an original line width for every pixel of the core line acquired at the core line extracting step; a judging step for judging whether it is indicative of an equal-width line or indicative of a surface figure by using the line width value for every pixel of the core line acquired at the line width estimation step, for every section delimiting the core line acquired at the core line extracting step between two points of intersections and endpoints; a separating step for separating a surface figure from the object image of the vectorization process on the basis of a result of the judging step; and a functionally approximating step for approximating functionally the core line judged to be the equal-width line at the judging step and a outline of the surface figure separated at the separating step, respectively.

An image processing apparatus of the present invention comprises: an image input unit for inputting an object image of a vectorization process; a core line extracting unit for extracting a core line of the object image of a vectorization process; a line width estimation unit for computing an original line width for every pixel of the core line acquired at the core line extracting step; a judgment unit for judging whether it is indicative of an equal-width line or indicative of a surface figure by using the line width value for every pixel of the core line acquired at the line width estimation unit, for every section delimiting the core line acquired at the core line extracting unit between two points of intersections and endpoints; a separation unit for separating a surface figure from the object image of the vectorization process on the basis of a result of the judging at judgment unit; and a functional approximation unit for approximating functionally the core line judged to be the equal-width line at the judgment unit and a outline of the surface figure separated at the separating unit, respectively.

In the present invention, even in a line drawing including the surface portion in a part of the image, the core line vectorization process is performed except the surface portion, and in other portions, the outline vectorization process is performed (or it is also possible that the vectorization process is not performed). By doing like that, acquired is the effect that not the vectorization by the uniform method (the core line vectorization process of the overall image, or the outline vectorization process of the overall image) as conventionally but an accommodative vectorization becomes possible.

As for the equal-width line portion, a vector result with little visual sense of incongruity as compared with the original image can be acquired, and an editing operation such as deleting or adding a part of lines, or adding a partial alteration of curvature, length, thickness, and line types (a continuous line, a broken line, an alternate long and short dash line, or the like) can be performed. The equal-width line can be separated at the intersection based on the connection status in the original image, and therefore, is separable in the unit which is easy to edit intuitively.

Further features of the present invention will become apparent from the following description of exemplary embodiments (with reference to the attached drawings).

BRIEF DESCRIPTION OF THE DRAWINGS

FIG. 7 illustrates a processing result for which a Euclid distance transformation of the image of FIG. 4 has been performed;

DESCRIPTION OF THE EMBODIMENTS

Hereinafter, a preferred embodiment of the present invention will be described in detail with reference to drawings. However, a component described in the embodiment is an exemplification to the last, and is not intended to limit the scope of the present invention.

Embodiment 1

First, an example of a configuration of an image processing apparatus of the present embodiment will be described with reference to a block diagram in FIG. 3.

Figure 3:
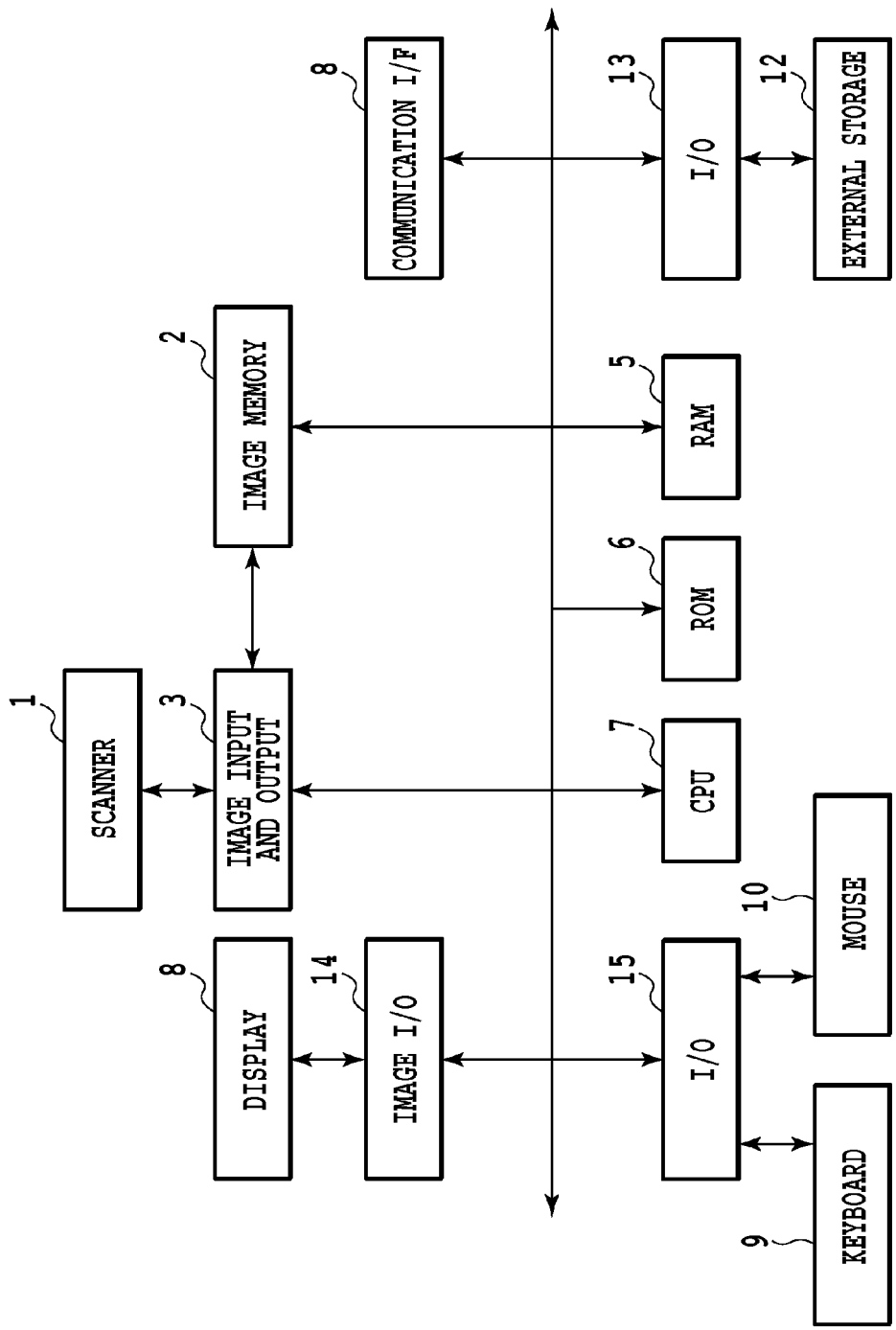
FIG. 3 is a block diagram illustrating an example of a device structure in Embodiment 1.

In FIG. 3, reference numeral 7 denotes a CPU (Central Processing Unit) which controls the device overall. Reference numeral 6 denotes a ROM (Read Only Memory) which stores a program which does not need alteration, or a parameter. Reference numeral 5 denotes a RAM (Random Access Memory) which stores temporarily the program, data, or the like supplied from an external device.

Reference numeral 1 denotes a scanner for acquiring digital image data by scanning photoelectrically a document, or the like, and reference numeral 3 denotes an image input/output interface which connects this scanner 1 with the image processing apparatus. Reference numeral 2 denotes an image memory holding the image data, or the like, read by the scanner 1.

Reference numeral 12 denotes an external storage including a hard disk and a memory card installed fixedly, or an optical disk such as a detachable flexible disk (FD) and a CD (Compact Disk), a magnetical or optical card, an IC card, a memory card, or the like. Reference numeral 13 denotes an input/output (Input/Output) interface connecting these external storage 12 with a computer apparatus.

Reference numeral 15 denotes an interface with a pointing device 10 such as a mouse and an input device such as a keyboard 9, by which data is inputted by an operation of a user. Reference numeral 14 denotes an interface with a display monitor 8 for indicating data which the image processing apparatus holds or which has been supplied. Reference numeral 4 denotes a network interface connecting with a network such as Internet. Reference numeral 11 denotes a system bus connecting each unit of 1 to 15 so that communication may become possible.

Hereinafter, steps of process which realizes the present invention by a program executed on the CPU 7 will be described using a flow chart of FIG. 1.

Figure 1:
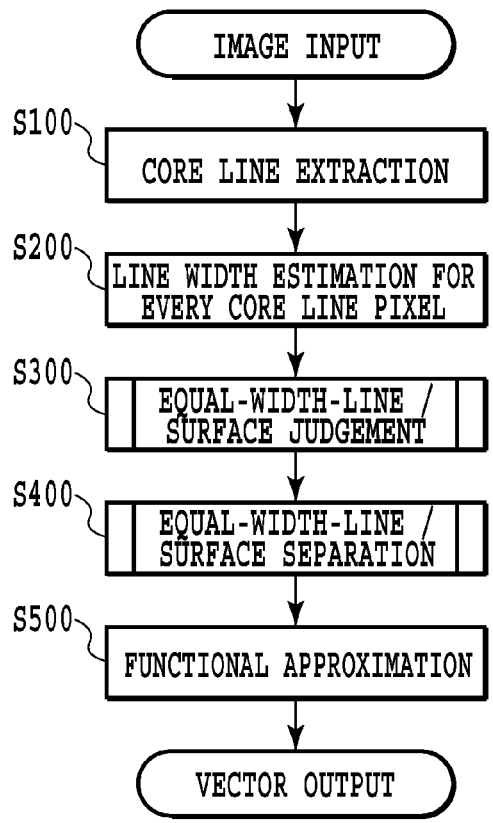
FIG. 1 is a flow chart showing a sequence of processing procedures in Embodiment 1.

FIG. 1 is the flow chart illustrating an overall flow of an operation in the device which carries out the present invention.

As illustrated in FIG. 1, when the process is started, image data including a image area (an area of a vectorization process object image) which will be a processing object will be inputted. As for the image input, the image data read by the scanner 1 is inputted into the image memory 2 via the image input/output I/O 3. The image including the image area to be the processing object may be inputted from the outside of the device via the communication I/F 4. The image data may be stored in advance in the external storage 12 to be read via the I/O 13. The inputted image is held on the image memory 2.

At step S100, after converting the inputted image into a binary format image, a core line is extracted using the thinning process (core line extraction). In the case of the inputted image being a multi-level image, a binarization processing is performed and the binary format image is acquired using a threshold value stored in advance in a not shown area on the ROM 6. In the case of the inputted image being the binary format image already, the process moves to a next step directly. The threshold value used in the binarization processing may be inputted so that the inputted image data may be displayed on the display monitor 8 via the image I/O and thereafter, an operator, recognizing this visually, may perform an instruction input using the keyboard 9 or the mouse 9 via the I/O 15.

Next, a thinning process is performed on the acquired binary format image. The thinning process is the process in which the line width on the figure in the binary format image is made to be narrow so as to be 1 pixel while maintaining a connection status in each part thereof as it is. As the thinning process, the well-known Hilditch method is used.

In the Hilditch method, a pixel at a noticed pixel position is made to be a central pixel, and it is judged whether the central pixel is a pixel for deletion by thinning by comparing the pixels inside the 3×3 window comprising the central pixel and the 8 pixels surrounding the central pixel with a mask pattern prepared in advance. In the case of the pixel at the noticed pixel position (x, y) being judged to be the pixel for deletion, this pixel is deleted. That is, this pixel is transposed from a black pixel to a white pixel.

On the other hand, in the case of the pixel at the noticed pixel position (x, y) being judged not to be the pixel for deletion, the noticed pixel position is made to be shifted to the next pixel position in raster scanning within a thinning process area, and the same process is repeated on all the pixel in the thinning object area after that. Then a sequence of processes by means of this raster scanning are repeated until the pixel deleted in one raster scanning stops occurring at all. The Hilditch method is the one in which the process of thinning is completed when the pixel deleted in one raster scanning has stopped occurring at all.

Figure 4:
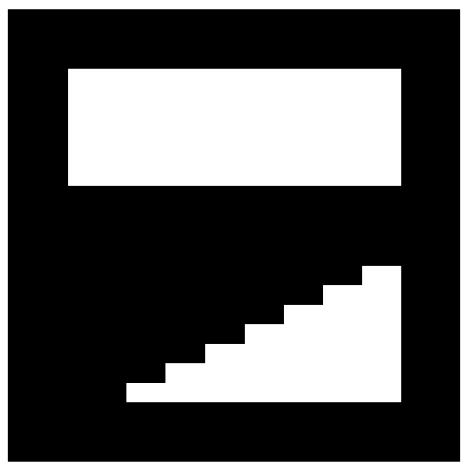
FIG. 4 illustrates a simple example of the line image in which the equal-width line portion and the surface portion are mixed.
Figure 5:
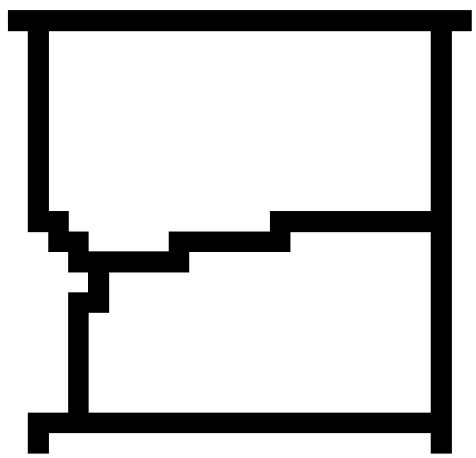
FIG. 5 illustrates a process result for which a thinning of the image of FIG. 4 is performed by the Hilditch method.

A result of the thinning of a line image illustrated in FIG. 4 by the Hilditch method is shown in FIG. 5. The Hilditch method is described in T. Agui and T. Nagao. ed. "*guide to image processing by C language*" first edition, ISBN4-7856-3124-4, (Shoko-do Co., Ltd., Nov. 20, 2000), p. 53 to 58.

Figure 6:
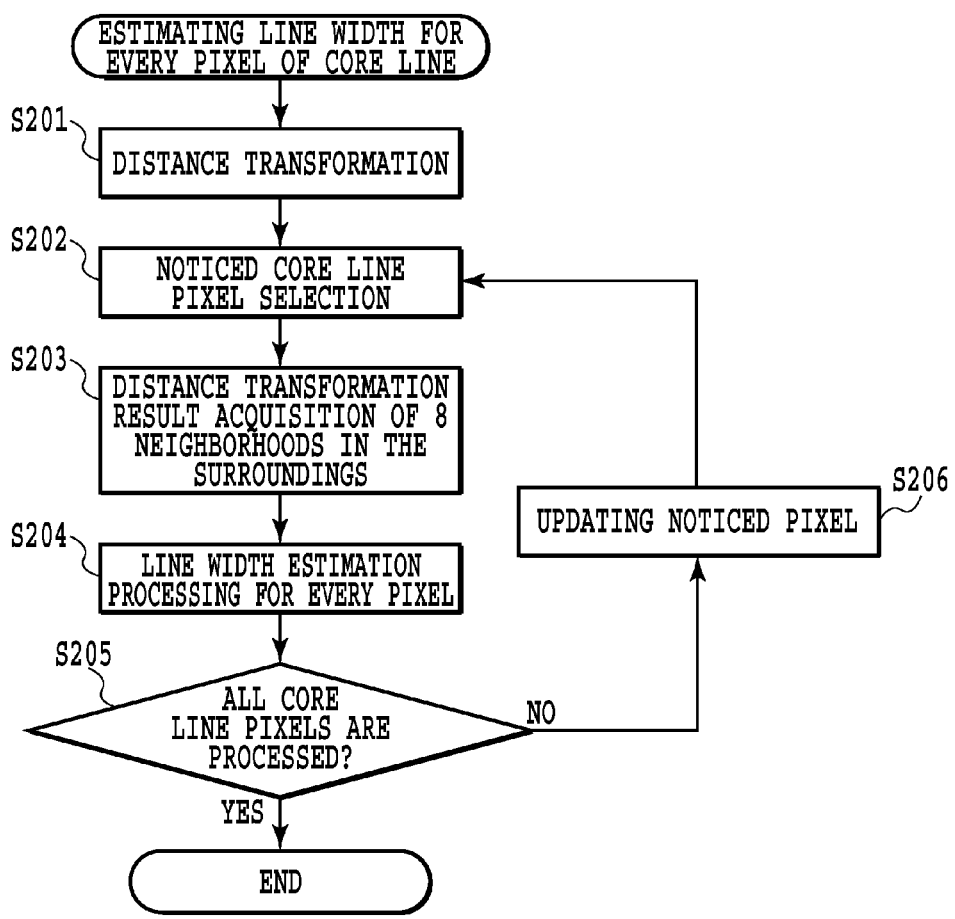
FIG. 6 is a flow chart showing a line width estimation processing step for every core line pixel.

At step S200, subsequently, a line width estimation processing for every noticed core line pixel is performed. This is the process which estimates the line width in a corresponding original image for every pixel of the core line acquired as the result of step S100. Here, a detail of a process of step S200 is shown in FIG. 6, and the detail of the process of step S200 will be hereinafter described using this FIG. 6.

(Line Width Estimation Processing)

Figure 7:
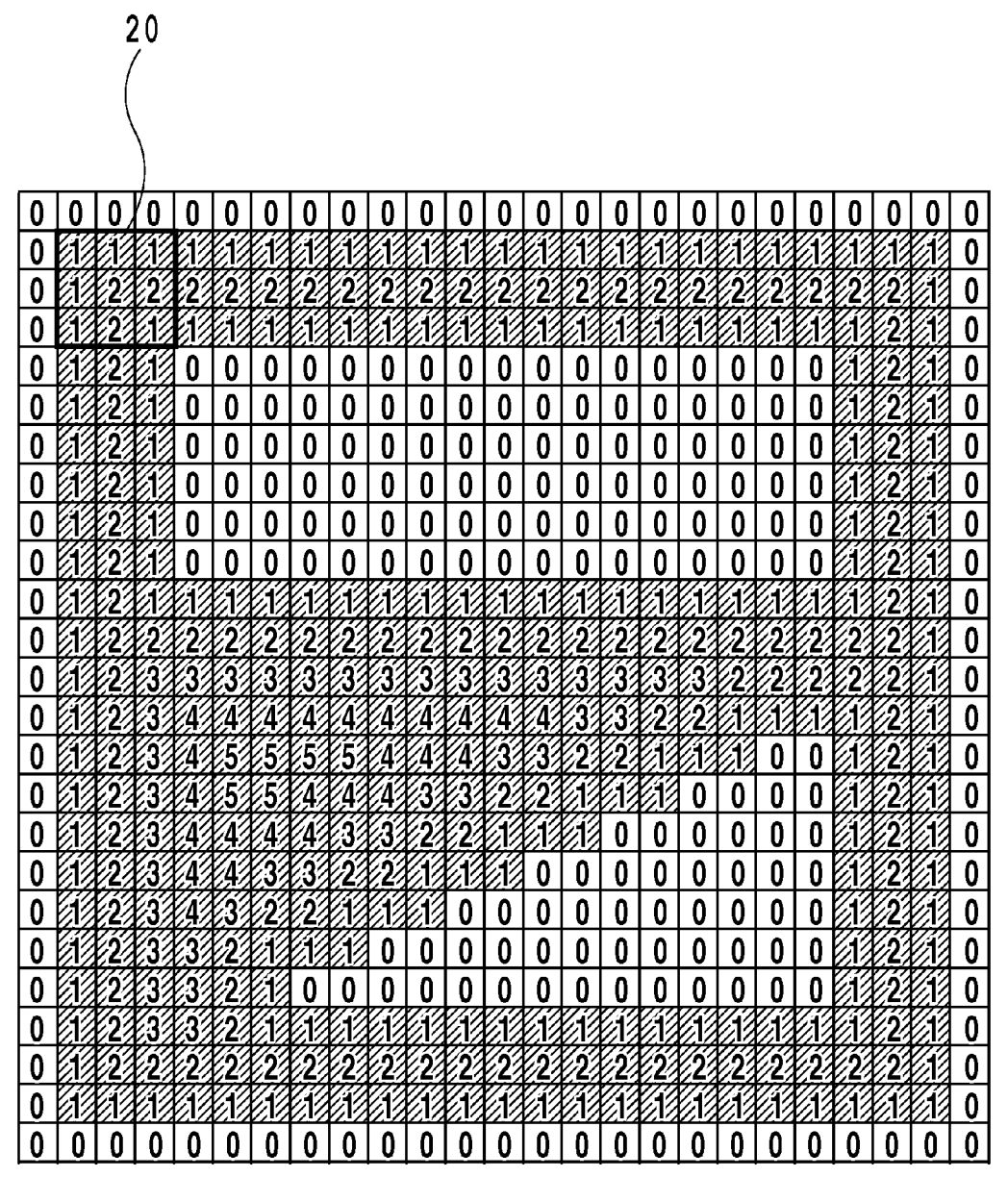

First, at step S201, a distance transformation is performed on the binary format image acquired as the inputted image. The distance transformation is a process to transpose a value of a figure pixel (black pixel) in the binary format image to a distance value from a background pixel (white pixel). The distance transformation is described in Jun-ichiro Toriwaki. ed. "*Digital Image Processing II for Image Comprehension*" first edition, ISBN4-7856-2004-8, (Shoko-do Co., Ltd., Apr. 30, 1988), p. 32 to 37. The distance to the background pixel of the nearest background is calculated for every figure pixel of the binary format image by the distance transformation. When using an Euclid distance transformation particularly also among distance transformations, which gives a mathematical distance to each pixel, the distance also in consideration of a diagonal direction can be calculated more accurately. As an example, a result of the Euclid distance transformation of the line image shown in FIG. 4 is shown in FIG. 7.

Figure 8:
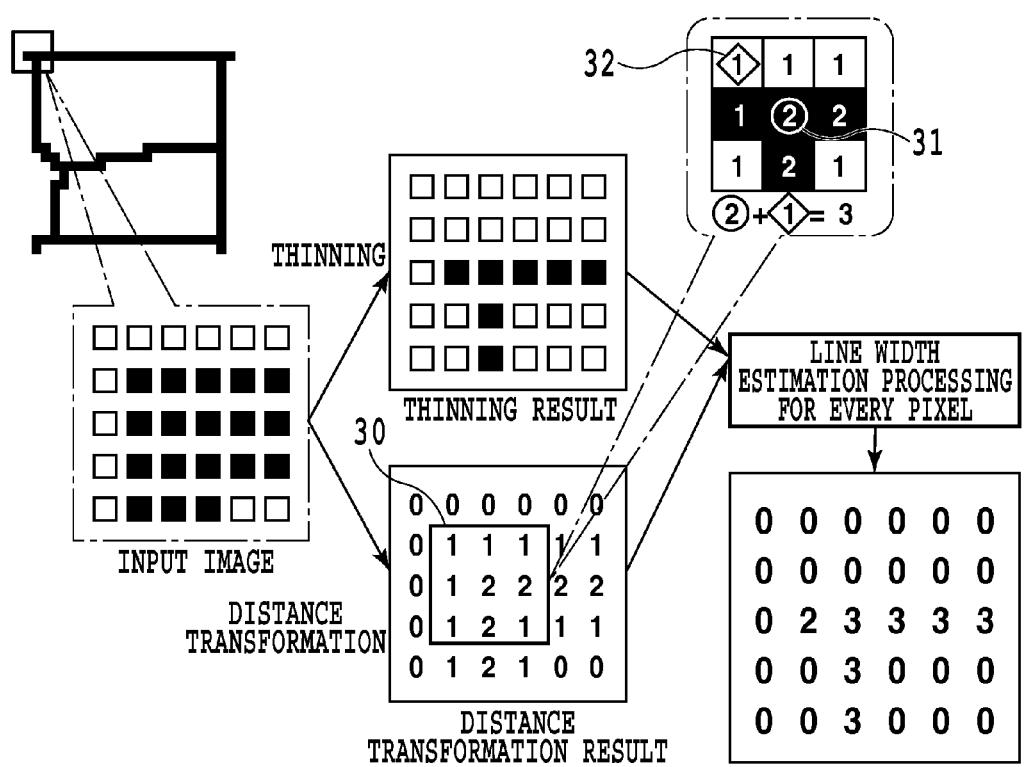
FIG. 8 illustrates a summary of the line width estimation processing.

Using the result of the distance transformation acquired at step S201, the corresponding line width in the original image is estimated for every pixel of the core line acquired at previous step 100. Summary of this process is illustrated in FIG. 8.

At S202, first, one pixel of the core line is selected and the pixel is made to be the central pixel, and at step S203, a result of the distance transformation calculated at step S201, which corresponds to the inside of the 3×3 window comprising the central pixel and the 8 pixels surrounding the central pixel, is acquired. For example, when the intersection of the core line located most in the upper left is taken for an example in the thinning result of FIG. 5, the result of the distance transformation corresponding to a frame line 20 of 3×3 in FIG. 7 or the frame line 30 in FIG. 8 will be acquired.

At step S204, on the pixel located on the core line acquired at step S202, the corresponding line width in the original image is estimated using the result (distance transformation value) of the distance transformation corresponding to the inside of the 3×3 window acquired at step S203. By adding the maximum value of the result of the distance transformation at the position where the core line pixel is not located, among 8 neighborhoods in the surrounding of the noticed core line pixel, to the result of the distance transformation corresponding to the noticed pixel having been selected at step S202, the line width value of the pixel on the core line selected at step S202 is calculated. The noticed pixel in FIG. 8 is "2" attached by a reference numeral 31, and the result of the distance transformation in the position where the core line pixel is not located is the part which is white in the surroundings of the pixel attached by the reference numeral 31. The maximum result of the distance transformation among those will be "1" attached by a reference numeral 32. Therefore, "1" is added to the result of the distance transformation of the noticed pixel "2", and the line width value of the noticed pixel becomes 3.

Figure 9:
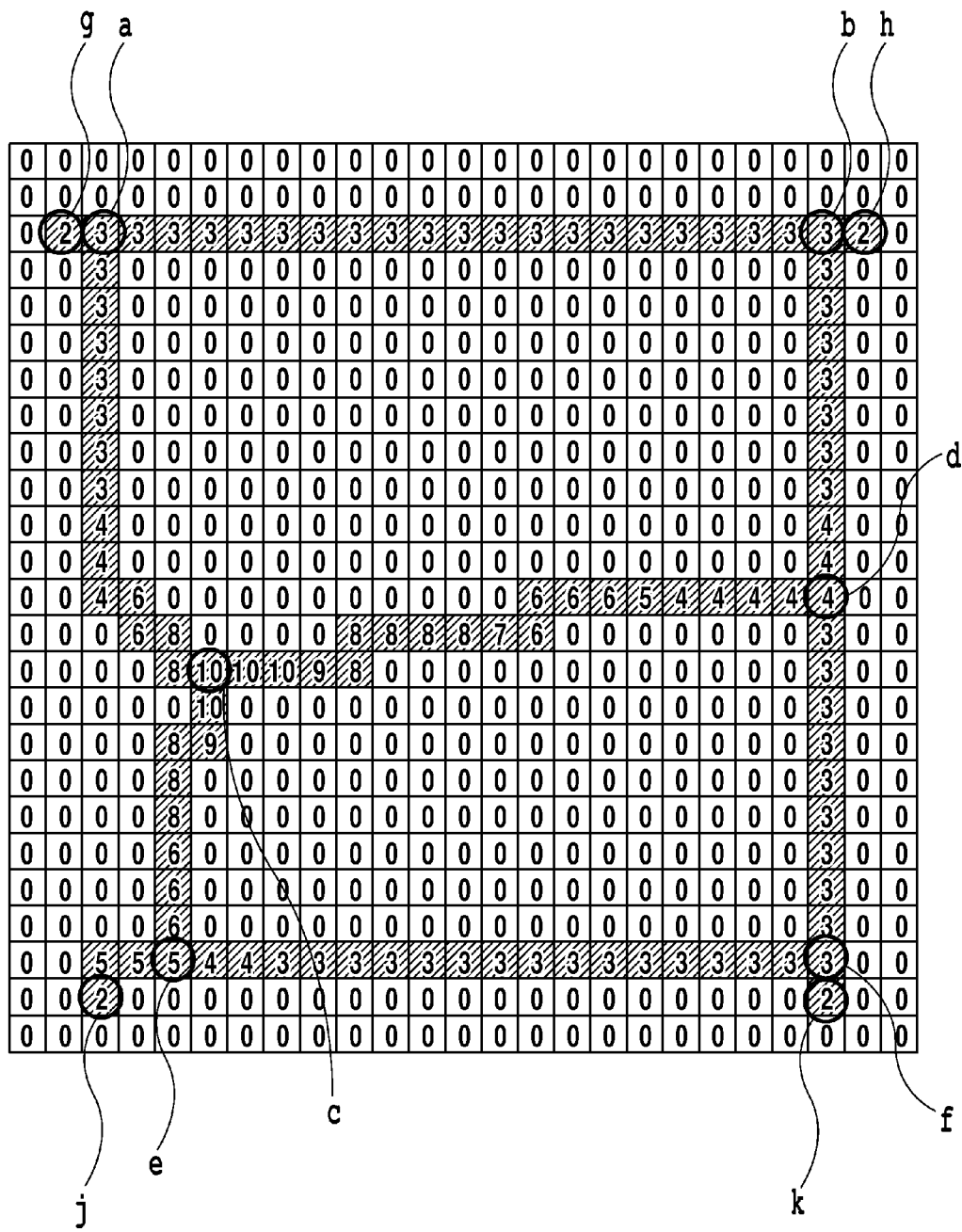
FIG. 9 illustrates the processing result for which the line width estimation processing of the image of FIG. 4 has been performed.

At step S205, it is confirmed whether the pixel of all the core lines has been processed. If there is a pixel still to be processed, the process returns to step S202 and is continued after updating the noticed pixel at step S206. In the case of all the pixels having been processed, the process moves to the next process after finishing the line width estimation processing for every pixel of the core line. FIG. 9 shows the result of calculation of the line width value for every pixel on all the core line pixels of the line image shown in FIG. 4.

Figure 10:
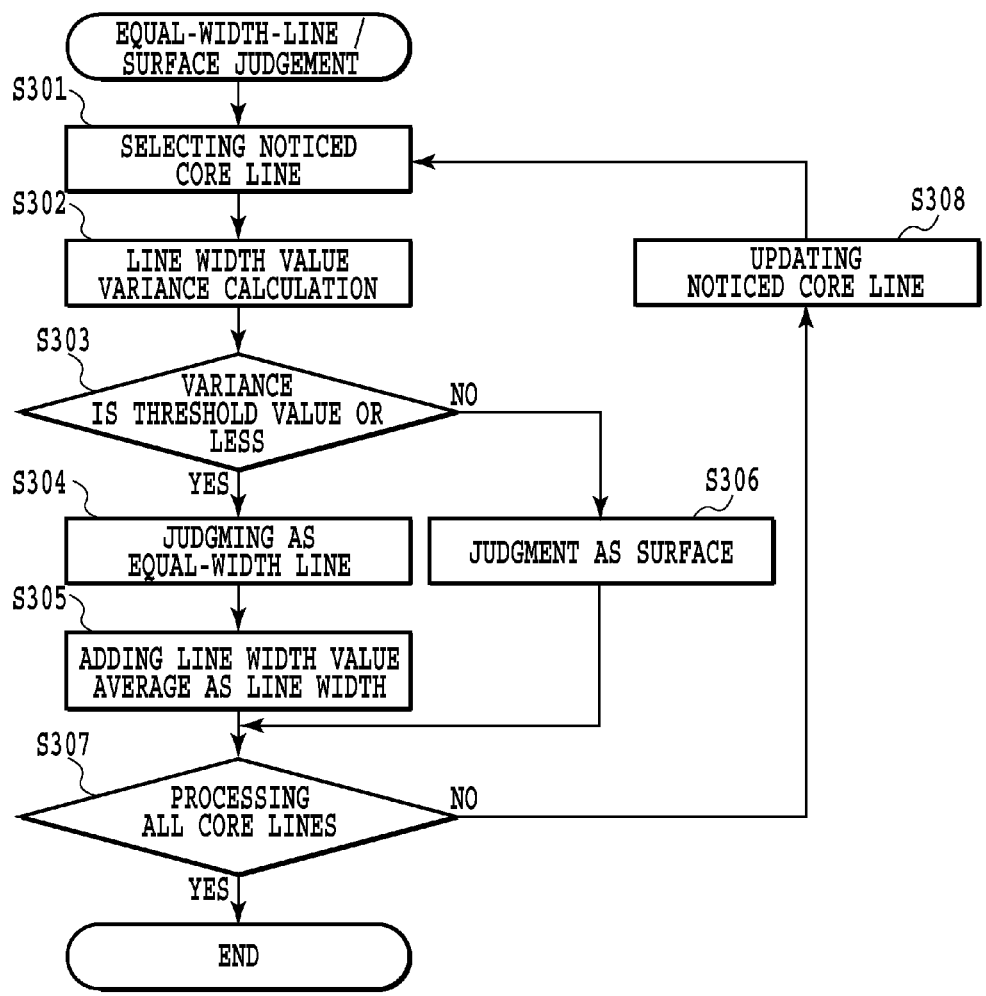
FIG. 10 is a flow chart showing a line/surface decision process procedure.

The process returns to FIG. 1, next, and at step S300, an equal-width-line/surface judgment processing is performed based on the core line acquired at step S100 and the line width information for every pixel of the core line acquired at step S200. A detail of the process of step S300 is illustrated in FIG. 10, the detail of the process of step S300 will be hereinafter described using this FIG. 10.

(Equal-Width-Line/Surface Judgment Processing)

At step S301, the core line on which the equal-width-line/surface judgment is performed is selected. The selection of the core line is made to be performed so that the core line acquired at step S100 may be made to be selected for every independent line and closed curve which connects two points of the endpoints and intersections to each other in between, that is, for every unit delimiting the core line between two points of the endpoints and the intersections. In FIG. 9, there exist intersections to which a reference symbol a to f are attached, and endpoints to which a reference symbol g to k are attached. At this time, the core line on which the equal-width-line/surface judgment is performed is determined in such unit as the section from g to a, the section from a to b, the section from b to h, and the section from a to c.

At step S302, on the core line selected at step S301, the variance of the line width value for every pixel calculated at step S200 corresponding to each pixel of the selected core line, is computed. As for the core line of an equal-width line, a variance tends to become small since the line width value for every pixel becomes a close value, and conversely, as for the line which is not equal-width or the core line of a surface, the magnitude of the line width value for every pixel varies, and a variance tends to become large. The variance of the specific section from b to d of FIG. 9 is 0.445 when calculated as a standard deviation, and the standard deviation of the specific section from c to d is 2.095.

At step S303, it is judged whether the variance calculated at step S302 is not more than the threshold value stored in advance in the area on the ROM 6 which is not shown. This threshold value can also be altered corresponding to the information of a length, or the like, of the core line of the judged object. In the case of not more than the threshold value, judging that the core line is the equal-width line at step S304, the information that the core line is the equal-width line portion is given on the core line selected at step S301. When the threshold value is 1.0, the specific section from b to d is judged to be the equal-width line part since the standard deviation thereof is 0.445, and the specific section from c to d is judged to be the surface part since the standard deviation thereof is 2.095.

After that, in step S305, the average of the line width value for every pixel calculated at step S200 is calculated, and the line width information is given to the core line. When the specific section of b to d is taken for an example, the average of the line width value is 3.273, and the information that the line width is 3 pixels when a portion not more than the decimal point thereof is rounded off, can be given thereto. At step S303, in the case of the variance calculated at step S302 is larger than the threshold value, judging that the core line is the surface part at step S306, the information that the core line is the surface is given to the core line.

At step S307, it is confirmed whether all the core lines have been judged. If there is the core line still to be judged, the process returns to step S301 and is continued after updating the noticed core line at step S308. In the case of all the core lines having been processed, the process moves to the next process after finishing the equal-width-line/surface judgment.

Figure 11:
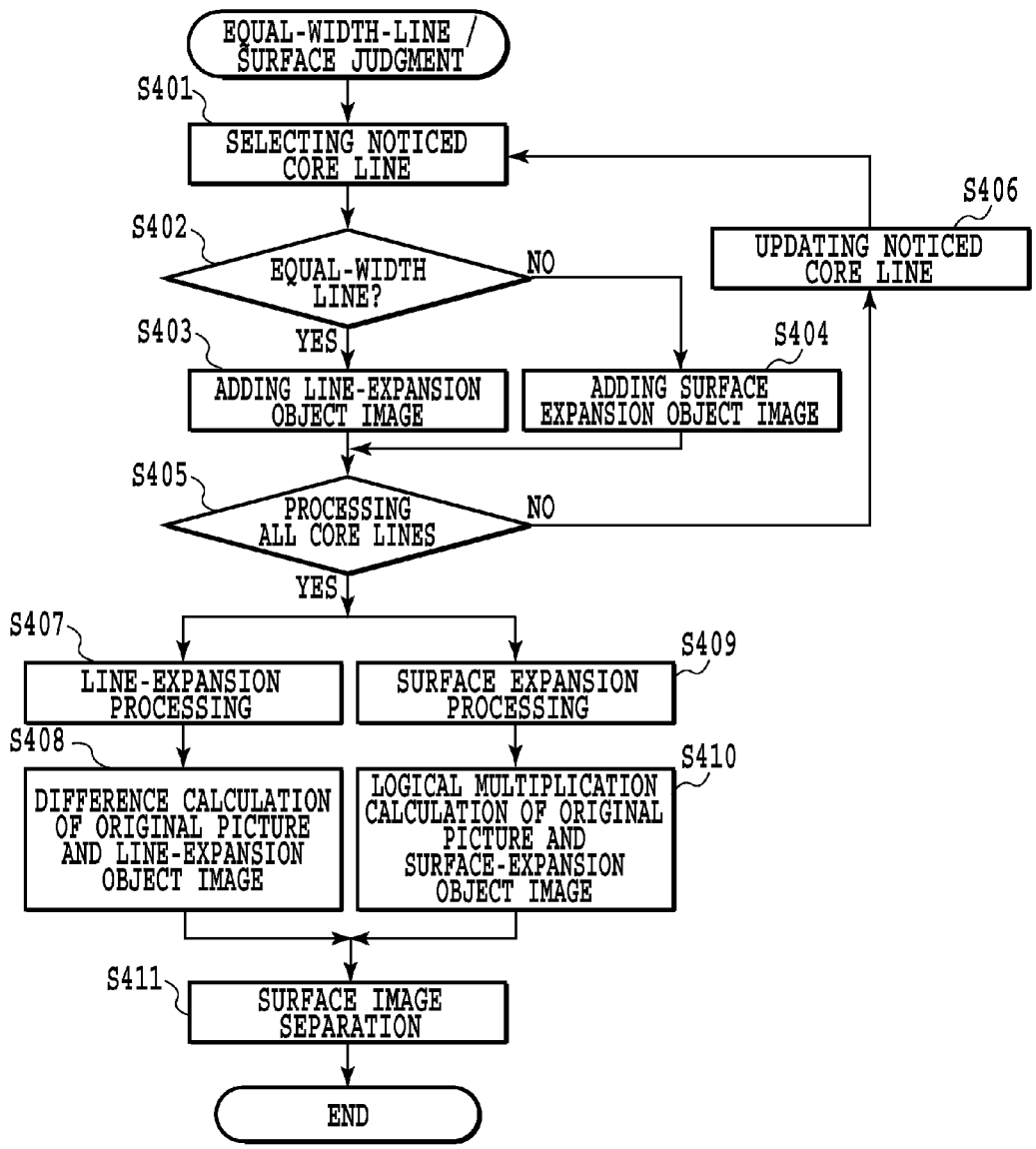
FIG. 11 is a flow chart showing a line/surface separation process procedure.
Figure 12:
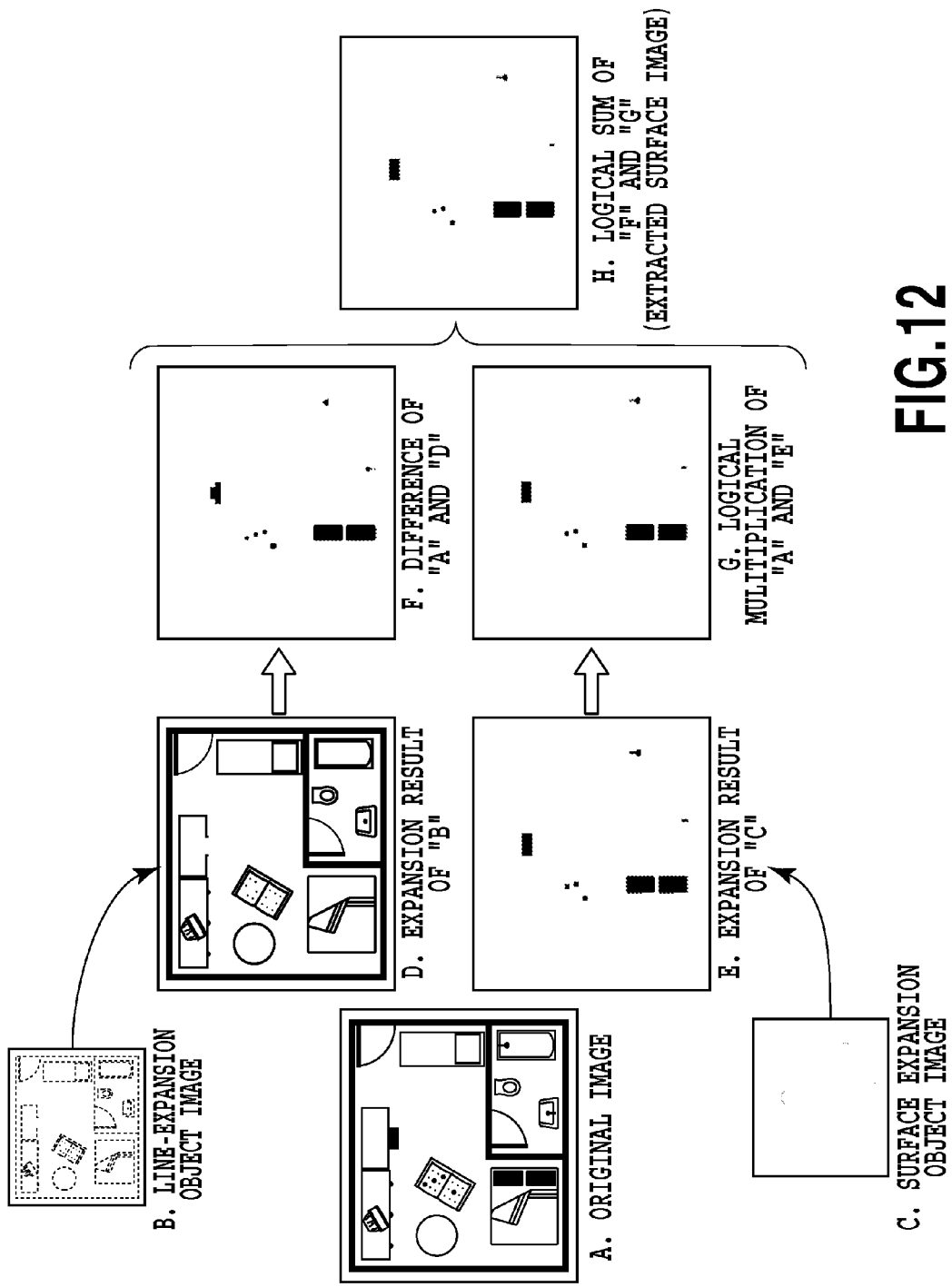
FIG. 12 illustrates a summary of the line/surface separation process.

The process returns to FIG. 1, next, and at step S400, an equal-width-line/surface separation processing is performed using the equal-width-line/surface judgment result having been acquired at step S300. Here, a detailed flow of a process of step S400 is illustrated in FIG. 11, and the detail of the process of step S400 will be hereinafter described using this FIG. 11. The summary of the process of step S400 is illustrated in FIG. 12.

(Equal-Width-Line/Surface Separation Processing)

First, performed is the processing to categorize all the core lines into the core line indicative of the equal-width line part, or the core line indicative of the surface part (surface figure). In step S401, one core line is selected like the selection having been performed at step S301 while making every independent line and closed curve which connects two points of those endpoints and intersections to each other in between into the unit of the core line. Then, step S402 refers to the information on whether the selected core line has been judged to be the equal-width line, or the selected core line has been judged to be the surface at step S300. In the case of the core line having been judged to be the equal-width line, the information on the core line is added to a line-expansion object image at step S403, and in the case of the core line having been judged to be the surface, the information on the core line is added to a surface expansion object image at step S404.

Subsequently, at step S405, it is judged whether all the core lines have been processed, and in the case of there being a core line still to be processed, the process returns to step S401 and is continued after updating the noticed core line at step S406. In the case of all the core lines having been judged, the process moves to the next process.

Figure 13:
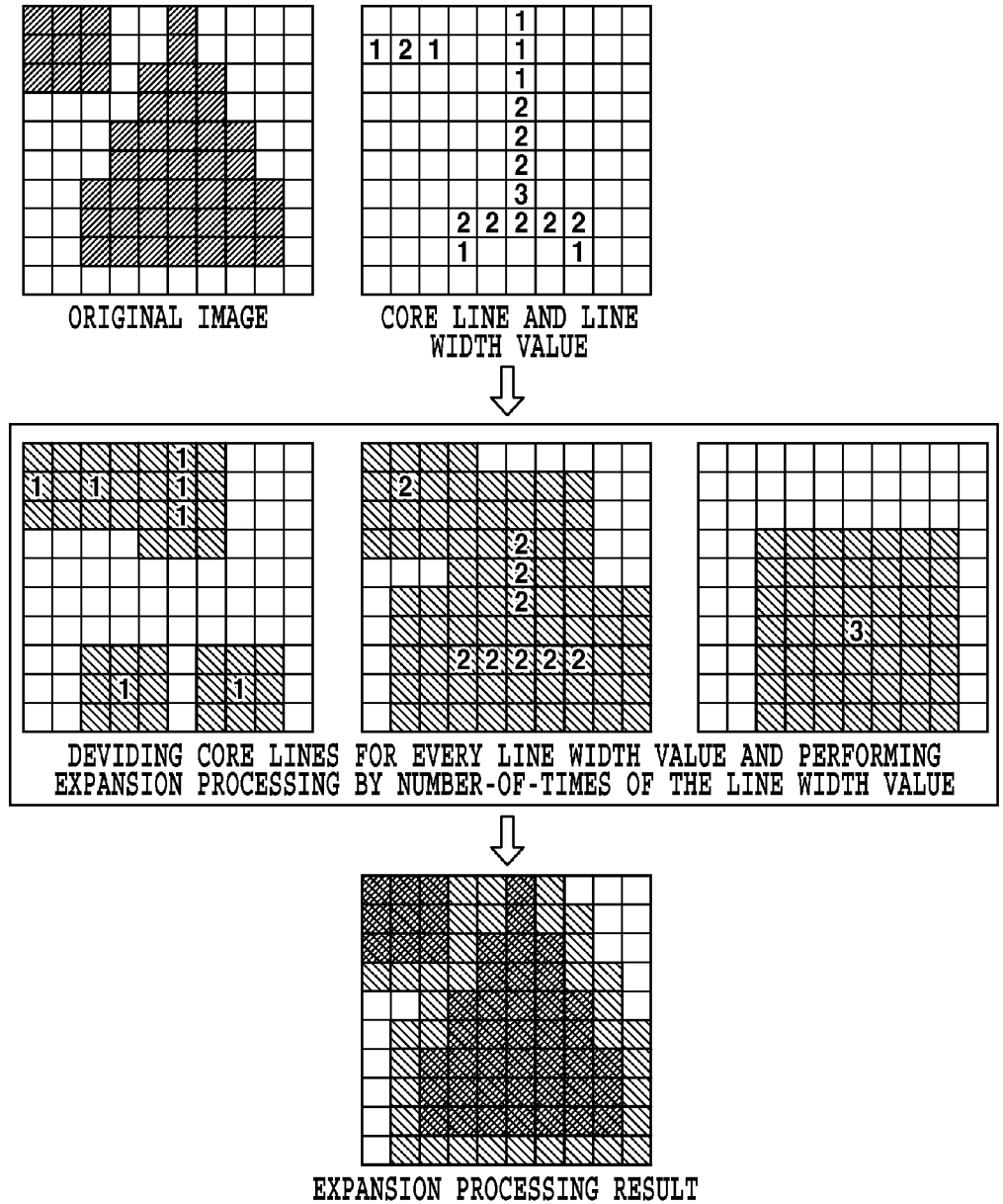
FIG. 13 illustrates an example of an expansion processing based on a distance from each pixel to a background.

The expansion processing is performed on the line-expansion object image, next, and the difference between the original image and the line-expansion object image (line-expansion processing result) on which the expansion processing have been performed is calculated. At step S407, the expansion processing is performed by the distance to the background individually on each pixel in the line-expansion object image. As for the distance from each pixel to the background referred to here, the distance transformation result which has been calculated at step S201 is used. As an example, the expansion processing based on the distance from each pixel to the background is illustrated in FIG. 13.

At step S408, when performed is superposition between the original image and the line-expansion object image on which the expansion processing has been performed, the difference between the original image and the line-expansion object image is calculated for every pixel located at the corresponding position as follows.

In the case of the figure pixel (black pixel) in the original image, and of the background pixel (white pixel) in the line-expansion object image on which the expansion processing has been performed, the pixel is made to be the figure pixel.

In the case of the figure pixel in the original image, and of the figure pixel in the line-expansion object image on which the expansion processing has been performed, the pixel is made to be the background pixel.

In the case of the background pixel in the original image, the pixel is made to be the background pixel.

With the image acquired as above, the difference of the original image and the line-expansion object image is calculated (difference calculation).

At step S409, the same expansion processing (surface expansion processing) as step S407 is performed on the surface expansion object image. Then, at step S410, with the image acquired by taking logical multiplication for every pixel located at the corresponding position when performed is the superposition between the original image and the surface expansion object image on which the expansion processing has been performed (surface expansion processing result), the logical multiplication between the original image and the expansion processing result of the surface expansion object image is calculated (logical multiplication calculation).

Subsequently, at step S411, a component image (surface image) which is to be made an object of the outline vectorization process is extracted. That is, a logical sum is taken for every pixel located at the corresponding position when performed is the superposition between the difference of the line-expansion object image acquired at step S408 on which the expansion processing has been performed and the result of the logical multiplication of the surface expansion object image acquired at step S410.

The image acquired in this way is made to be the component image which is to be the object of the outline vectorization process (surface image).

In the case of the difference between the original image and the line-expansion object image on which performed is the expansion processing based on the distance from each pixel to the background, there is a problem in which a boundary between the equal-width line part and the surface part has been disconnected and separated. Then, this part having been disconnected and separated can be corrected by calculating the logical sum between this difference and the result of the logical multiplication between the original image and the surface expansion object image on which performed is the expansion processing based on the distance from each pixel to the background acquired at step S410.

The process returns to FIG. 1, next, and at step S500, the core line vectorization process is performed on the core line judged to be the equal-width line part among the core lines acquired at step S300, and the outline vectorization process is performed on the outline of the surface part acquired at step 400.

The core line vectorization process vectorizes every independent line and closed curve connecting two points of the endpoints and the intersections to each other in between which composes the binary format image having been thinned. With respect to the core line vectorization process, the vectorization by Japanese Patent Application No. 2006-100381 mentioned above is performed. Performed is the processing for smoothing (functional approximation) the thinned vector (round) between any two points of the endpoints on which the core line extraction has been performed corresponding to the line component acquired from every independent line and closed curve connecting two points of the endpoints and the intersections to each other in which composes the binary format image having been thinned. In the case of this processing, starting point and terminating point information expressing clearly the part corresponding to the endpoint part is generated so that the vector corresponding to the endpoint part may not be combined with other vectors and the endpoint position may not become obscure.

Then, an artificial vector is inserted so that the part corresponding to the endpoint part may be stored as the endpoint (corresponding to a anchor point in a Bezier curve). Then, a second-order or third-order Bezier curve approximation is performed on the acquired vector with the artificial vector (round) between any two points of the endpoints by the method of Japanese Patent Laid-open No. 2005-346137. Thus, the core line vectorization of the binary format image having the line width of 1 which has been acquired by performing the connection between two points of the endpoints or of the intersections, or by leaving independent lines or closed curve parts, is performed for every independent line and closed curve connecting two points of those endpoints or intersections to each other in between.

On the other hand, about the outline vectorization process, the vectorization by Japanese Patent No. 3026592 and Japanese Patent Laid-Open No. 05-108823 mention above is performed. That is, the outline vector is extracted from the binary format image, and the outline vector which can be varied in the magnification smoothly with the desired magnification ratio (arbitrary) is created in the state of the extracted outline vector representation.

Figure 2:
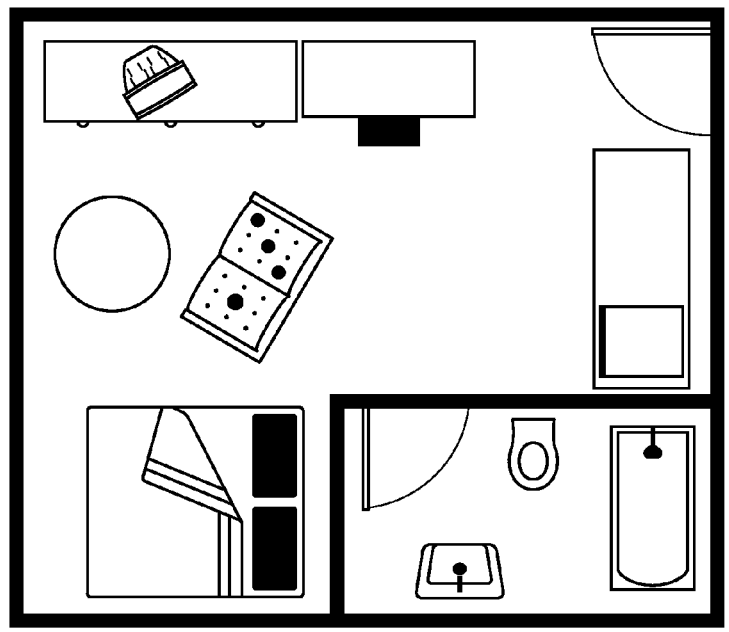
FIG. 2 illustrates an example of a line image in which an equal-width line portion and a surface portion are mixed.
Figure 14:
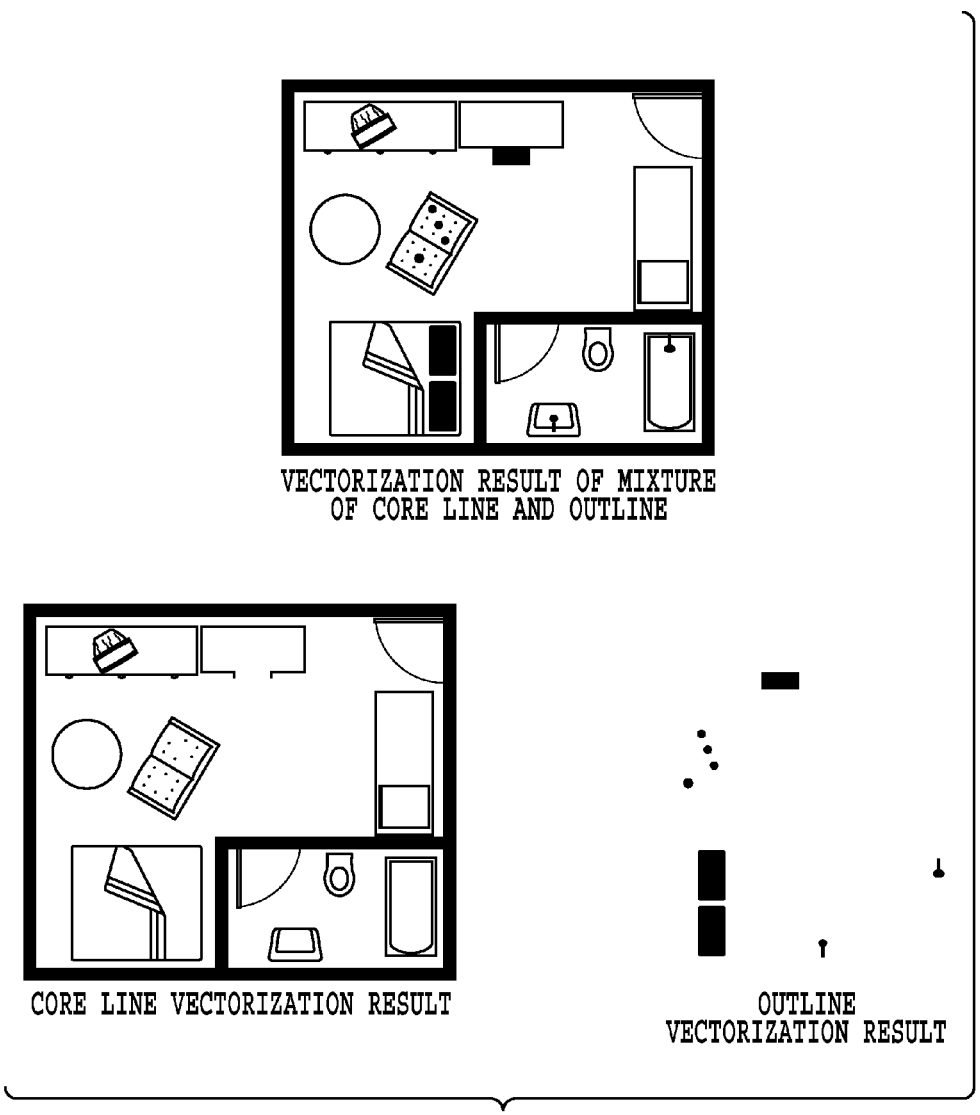
FIG. 14 illustrates a result for which, with respect to the image of FIG. 2, a core line vectorization process of the equal-width line portion is performed with the line width information, and a outline vectorization process of the surface potion is performed.

A sequence of processes are finished by outputting as one vector data integrating the outline vector acquired at step S500, the core line (line art) vector, and the line width information added to the core line of the equal-width line acquired at step S300. As an example, in FIG. 14, shown is the result in which the image of FIG. 2 shown above is made to be separated into the equal-width line part and the surface part, and in which performed is the core line vectorization process of the equal-width line part with line width information, and in which the outline vectorization process of the surface part has been performed.

Embodiment 2

In the above-mentioned embodiment 1, as for the pixel which is made to be the object of which the variance is calculated in step S302, all the pixels of the core line of the judging object may be made to be the object, or only a part thereof may be made to be the object. In the vicinity of the intersection with other core lines, the estimated line width value for every pixel becomes larger than an actual value, and therefore, the exclusion thereof from the variance computation will enable the more exact equal-width line judgment.

Generation of the line width information in step S305 is not necessarily based on calculating the average of the line width value for every pixel, and not only the average but also a mode value or the average with weight (weighted mean) in consideration of the minimum and the maximum may be used for the calculation.

Embodiment 3

In the above-mentioned embodiments 1 and 2, although the story was made to go on with the prerequisite that the distance transformation is performed using the Euclid distance transformation, the method of the distance transformation is not limited to this, and other method may be used. That is, other than the Euclid distance transformation as the well-known distance transformation method, 4-neighborhood distance (City block distance), 8-neighborhood distance (Chessboard distance), Octagon-distance, or the like, is known and any of them may be used.

Embodiment 4

The object of the present invention is attained also by a computer of a system and device (or a CPU and MPU) which reads and executes the program code from the recording medium storing the program code realizing the steps of the flow chart shown by the embodiment mentioned above. In this case, the computer-executable program code itself read from the storage medium will realize the function of the embodiments mentioned above. Therefore, the present invention comprises this program code and also the computer-readable storage medium storing the program code.

As the storage medium for outputting the program code, for example, a flexible disk, a hard disk, an optical disk, a magneto-optic disk, a CD-ROM, a CD-R, a magnetic tape, a nonvolatile memory card, a ROM, a DVD, or the like, can be used.

By executing the program code which the CPU reads, the functions of the embodiments mentioned above are not only realized. An operating system (OS), or the like, working on the CPU performs some or all of actual processes based on instructions of the program code, and it is not necessary to say that the cases of the functions of the embodiments mentioned above being realized by the processes is also included.

Further, the program code read from the storage medium is realized also by an expansion board inserted in the image processing apparatus and a function expansion unit connected to the image processing apparatus. In this case, the program code read from the storage medium is written in a memory with which the expansion board and the function expansion unit are equipped. After that, a CPU or the like, with which the expansion board and function expansion unit are equipped, performs some or all of actual processes based on instructions of the program code thereof, and the functions of the embodiments mentioned above are realized also by the processes thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-120296, filed May 2, 2008, which is hereby incorporated by reference herein in its entirety.

What is claimed is:

1. An image processing method, comprising the steps of:
an image inputting step for inputting an object image of a vectorization process;
a core line extracting step for extracting a core line of the object image of the vectorization process;
a line width estimating step for computing an original line width for every pixel of the core line acquired in said core line extracting step;
a judging step for judging whether there is an indication of an equal-width line or of a surface figure by using the line width value for every pixel of the core line acquired in said line width estimating step, for every section delimiting the core line acquired in said core line extracting step between two points of intersections and endpoints;
a separating step for extracting, based on the core line in the section judged in said judging step as having an indication of the equal-width line and the core line in the section judged in said judging step as having an indication of the surface figure as well as the object image of the vectorization process, a surface image formed of a partial image corresponding to the surface figure in the object image of the vectorization process by excluding a partial image corresponding to the equal-width line; and
a function approximation step for performing function approximation on each core line in the section judged as having an indication of the equal-width line in said judging step and an outline of the surface image extracted in said separating step.

2. The image processing method according to claim 1, wherein the core line extracting step extracts a core line of the object image of the vectorization process by performing a thinning process on the object image of the vectorization process.

3. The image processing method according to claim 1, wherein said line width estimating step comprises the steps of:
  converting each figure pixel in the object image of the vectorization process into a distance value to a background pixel; and
  estimating the line width of a noticed core line pixel by setting a pixel in the core line as the noticed core line pixel and adding a maximum value of the distance value of the pixel located at each of eight neighborhoods surrounding the noticed core line pixel to the distance value of the noticed core line pixel.

4. The image processing method according to claim 1, wherein said judging step comprises the steps of:
  calculating a variance of the line width value of the core line for each section;
  judging that the core line corresponds to the equal-width line in the case of the variance being not more than a threshold value; and
  judging that the core line is corresponds to the surface in the case of the variance being larger than the threshold value.

5. The image processing method according to claim 1, wherein line width information is estimated on the section judged as having an indication of the equal-width line in said judging step, and the estimated line width information is given to vector data.

6. The image processing method according to claim 1, wherein said separating step comprises:
  a line-expansion processing step for performing an expansion processing of the section judged as having an indication of the equal-width line in said judging step;
  a surface-expansion processing step for performing an expansion processing of the section judged as having an indication of the surface figure in said judging step;
  a difference calculation step for calculating a difference between the object image of the vectorization process and a result of said line-expansion processing step;
  a logical multiplication calculation step for calculating a logical multiplication between the object image of the vectorization process and a result of said surface-expansion processing step; and
  a step for extracting the surface image by calculating a logical sum between a processing result of said difference calculation step and a processing result of said logical multiplication calculation step.

7. An image processing apparatus comprising:
  an image input unit for inputting an object image of a vectorization process;
  a core line extracting unit for extracting a core line of the object image of the vectorization process;
  a line width estimation unit for computing an original line width for every pixel of the core line acquired by said core line extracting unit;
  a judgment unit for judging whether there is an indication of an equal-width line or of a surface figure by using the line width value for every pixel of the core line acquired by said line width estimation unit, for every section delimiting the core line acquired by said core line extracting unit between two points of intersections and endpoints;
  a separation unit for extracting, based on the core line in the section judged by said judgment unit as having an indication of the equal-width line and the core line in the section judged by said judgment unit as having an indication of the surface figure as well as the object image of the vectorization process, a surface image formed of a partial image corresponding to the surface figure in the object image of the vectorization process by excluding a partial image corresponding to the equal-width line; and
  a function approximation unit for performing function approximation on each core line in the section judged as having an indication of the equal-width line by said judgment unit and an outline of the surface image extracted by said separating unit.

8. The image processing apparatus according to claim 7, wherein said core line extracting unit extracts a core line of the object image of the vectorization process by performing a thinning process for the object image of the vectorization process.

9. The image processing apparatus according to claim 7, wherein said line width estimation unit comprises;
  a unit for converting each figure pixel in the object image of the vectorization process into a distance value to a background pixel; and
  a unit for estimating the line width of a noticed core line pixel by setting a pixel in the core line as the noticed core line pixel and adding a maximum value of the distance value of the pixel located at each of eight neighborhoods surrounding the noticed core line pixel to the distance value of the noticed core line pixel.

10. The image processing apparatus according to claim 7, wherein said judgment unit comprises:
  a unit for calculating a variance of the line width value of the core line for each section;
  a unit for judging that the core line corresponds to the equal-width line in the case of the variance being not more than a threshold value; and
  a unit for judging that the core line corresponds to the surface in the case of the variance being larger than the threshold value.

11. The image processing apparatus according to claim 7 wherein a-line width information is estimated on the section judged as having an indication of the equal-width line by said judgment unit, and the estimated line width information is given to vector data.

12. The image processing apparatus according to claim 7, wherein said separation unit comprises:
  a line-expansion processing unit for performing an expansion processing of the section judged has having an indication of the equal-width line by said judging unit;
  a surface-expansion processing unit for performing an expansion processing of the section judged as having an indication of the surface figure by said judging unit;
  a difference calculating unit for calculating a difference between the object image of the vectorization process and a result of said line-expansion processing unit;
  a logical multiplication calculating unit for calculating a logical multiplication between the object image of the vectorization process and a result of said surface-expansion processing unit; and
  a unit for extracting the surface image by calculating a logical sum between a processing result of said difference calculating unit and a processing result of said logical multiplication calculating unit.

13. A non-transitory computer-readable storage medium storing an executable program for causing a computer to perform a method, the method comprising the steps of:
  inputting a vectorization process object image;
  extracting a core line of the vectorization process object image;
  computing an original line width for every pixel of the core line acquired in said core line extracting step;

judging whether every section is indicative of an equal-width line or indicative of a surface figure by using the line width value for every pixel of the core line acquired in said line width computing step, the section delimiting the core line acquired in said core line extracting step between two points of intersections and endpoints;

separating by extracting, based on the core line in the section judged in said judging step as being indicative of the equal-width line and the core line in the section judged in said judging step as being indicative of the surface figure as well as the vectorization process object image, a surface image formed of a partial image corresponding to the surface figure in the vectorization process object image by excluding a partial image corresponding to the equal-width line; and performing function approximation on each core line in the section judged as being indicative of the equal-width line and an outline of the separated surface figure.

\* \* \* \* \*